July 4, 1967   B. C. HUDSON   3,328,814
TAP
Filed Dec. 7, 1964
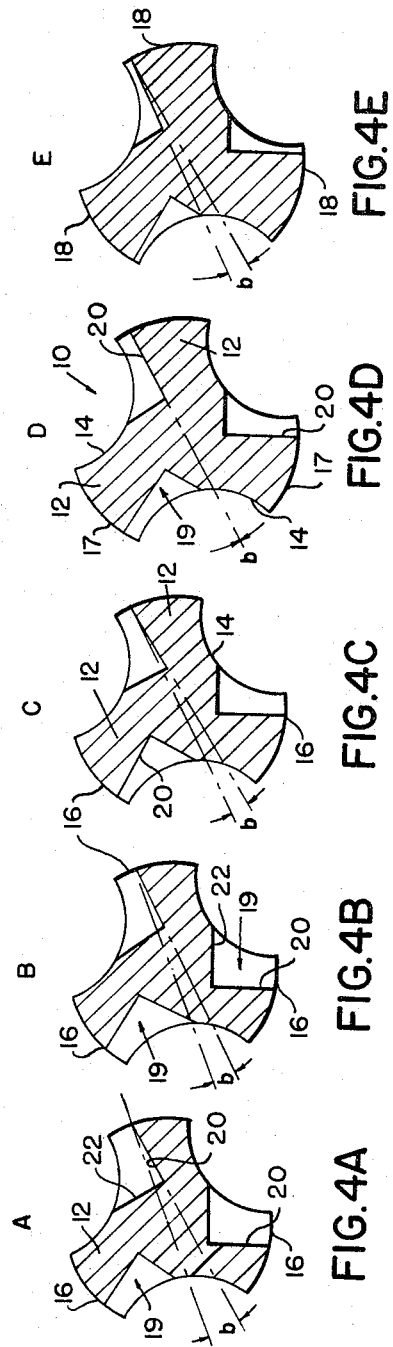
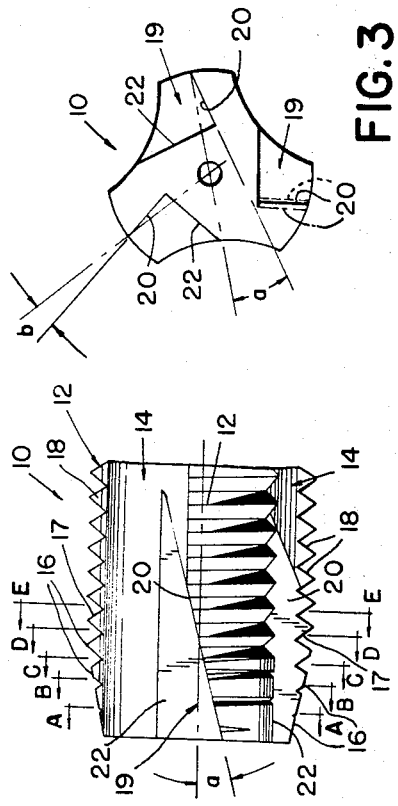
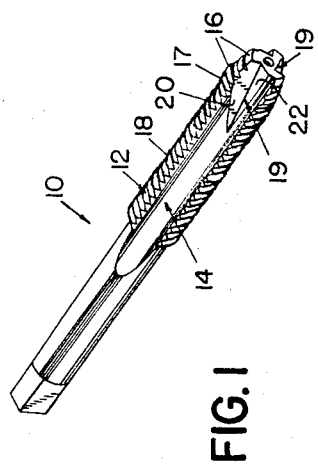
INVENTOR.
BEAUMONT C. HUDSON
BY
ATTORNEYS

3,328,814
TAP

Beaumont C. Hudson, Oxford, Mich., assignor to National Twist Drill & Tool Company, Rochester, Mich., a corporation of Michigan
Filed Dec. 7, 1964, Ser. No. 416,335
4 Claims. (Cl. 10—141)

The present invention relates to improvements in a thread cutting tap of the type which, as conventionally produced, is characterized by a chip clearing or expelling skew formation, in each of the two or more flutes thereof, which extends at an angle to the axis of the tap and through the chamfered or tapered tip of the latter. In the usual case, the axial extent of this skew formation, or so-called spiral point or gash, amounts to approximately three to five threads, and it has in the past been radially outwardly concave, i.e., in the form of a segment of a cylinder. A tap so characterized is commonly designated as being a "gun" or "chip driver" type, since the function of the spiral point is to propel the spiral cuttings or chips forwardly through the tip of the tap. Characteristically, the spiral point provides a substantially uniform positive, effective rake angle of about 15° at the chamfered cutting threads of the tap's land.

It has been found, however, that such conventional gun taps sometimes fail to cut properly, as for example, when working on SAE 1010 steel. This may be because the continuous curled or intertwined chips tend to hang up on the tap flutes and consequently clog the nut or other object being tapped. It is particularly objectionable if the cuttings intertwine closely together in a bottom or blind hole tapping operation, making it difficult to remove the chip material from the tapped opening.

It is therefore a general object of the invention to provide a threading tap (the principles of the invention being also deemed to be applicable to a thread cutting die) which is provided with an improved sort of planar or substantial planar skew gash milled or otherwise cut in each of the arcuate flutes thereof at an appropriate skew angle to the tap axis. A surface of the skew formation shapes a side of an adjacent land in such a way as to break up the thread cutting into separate small, curved chips, which are propelled axially forwardly by the skew through the tip of the tool, and can also be easily and quickly flushed out after a bottoming or blind tap operation.

It is a further object of the invention to provide a tap having these advantages in cutting by reason of the fact that, due to geometrical considerations, the skew surface formation shapes the cutting edges of the threaded and chamfered lands to provide novel positive rakes at said cutting edges, the rake angles diminishing rearwardly in angularity relative to a plane including the tap axis throughout a distance of, say, four to eight cutting threads at the chamfered zone.

Because of this variation in rake angle the cutting load at the forward end of the tap is well distributed and balanced; and by the same token the tool is well supported at its cutting edges when reversed and backed out of the work, so as not to break off at these sensitive points. This sometimes occurs in the tapping of certain metals, such as stainless steel.

In general, it is an object of the invention to provide an improved tap which, in addition to affording the above advantages attributable to decreasing cutting rake angles, permits the degree of rake angle to an axial plane to be readily varied, as determined, for example, by the nature of the material being tapped. This is due to the novel type of skew surface contemplated by the invention. The tap also makes possible a better finish of the tapped threads under true shear, as well as a more exact maintenance of specified tolerances than heretofore practical.

More specifically, in accordance with the invention, the skew gash of the improved tap is in the form of a flat, or substantially flat, planar surface milled on the flute at a selected skew angle to the tap axis. This surface extends from the tip of the tap for, say, four to eight threads axially to the rear, and preferably at least to the first full cutting thread of the tap behind its tip chamfer.

As indicated above, the geometry of the flute and skew surface formation and intersection is such that the cutting rake at successive threads may be made to decrease to the rear from about 15°–30° at the tip or nose of the tap to a zero rake at the first full cutting thread, or even to a negative rake slightly in advance of or behind the latter, if desired. This is in view of the fact that no significant cutting action occurs beyond the first unchamfered thread, but only a desired guiding effect, in the manner of a lead screw. There is also the possibility that some amount of thread flank-shaving action may be desired to the rear of the first full depth tapping cut. However, in general it is contemplated that the rake angle shall be zero, or radial of the tap axis, at the first full cutting thread, increasing forwardly to the tip of the tool for the desirable chip breaking and ejecting effect.

By providing for a reduction in effective positive rake amounting to, say, 5° for each thread in rearward progression at the tapered or chamfered tip, not only does a great improvement in chip control result, but also the flat skew surface, which is readily controlled as to position for a simple milling or grinding cut at the flute, enables the rake angle to be adjusted as desired for different metals being tapped. Thus, for instance, a skew angle to the tap axis may range from 20° down to 3° to permit the rake angle to be varied from 30° down to 0, or to a negative value.

It is also contemplated that the same result may be had by simply positioning the plane of the skew surface variably relative to the tap axis, without change of angularity, or by a combination of these procedures.

The foregoing as well as other objects will become more apparent as this description proceeds, especially when considered in connection with the accompanying drawings illustrating the invention, wherein:

FIG. 1 is a perspective view of the improved tap of the invention;

FIG. 2 is a fragmentary side elevational view showing a leading portion of the tap on which the above-mentioned flat skew surface is formed at a typical skew angle *a* relative to the axis of the tap;

FIG. 3 is an end view of the tap, as from the left of FIG. 2; and

FIGS. 4A–4E are, respectively, views showing sections transversely of the tap axis, on planes corresponding to the planes A—A, B—B, C—C, D—D and E—E, respectively, of FIG. 2, these sections showing the progressively decreasing rake angle *b* of thread cutting edges from the tip of the tap toward its axial rear.

The improved tap of the invention, generally designated by the reference numeral 10, is conventionally formed to include two or more threaded lands 12 separated in equal circumferential spacing to one another by flutes 14 of radially outwardly concave, quasi-cylindrical outline on axes paralleling the axial center line of the tap 10. Likewise, the tap is tapered or chamfered at the forward ends of the lands 12 to shape a number of arcuately segmental cutting threads 16 of progressively increasing, but not full, radial depth and progressively diminishing axial width, affording cutting edges in the chamfered zone at which a drilled workpiece opening is progressively tapped.

As indicated in FIG. 2 of the drawings, there are four of these partial-depth cutting threads proceeding from left to right up to the first annular set of full-depth threads, specially deseignated 17, by which the final cutting action on a nut or other workpiece is completed. The number of threads 16 may range up to eight depending on factors of desired tapping depth, pitch and the like, but will usually be at least two. Further full-depth threads 18 formed on the body of tap 10 to the axial rear of the threads 17 are primarily screw-like guiding threads, although if desired, some degree of shaving of the tapped thread flanks may also be performed by threads 18.

In accordance with the present invention, as shown in FIGS. 1–3, the tap 10 is shaped by milling or grinding longitudinally in its forward chamfered zone to provide a special skew formation or so-called skew gash 19, including a flat, planar surface 20 diverging at the skew angle $a$ from the center axis $c$ of the tap. As indicated above, this angle may fall in the approximate range of 3°–20°, depending upon the desired rake angle $b$ at the thread cutting edges, which will in turn be determined primarily by the characteristic of the metal being tapped. The cut which forms the surface 20 of skew formation 19 on the tap body produces a side wall 22 in a plane paralleling the tap axis and at 90° to the skew surface 20; however it is in respect to the last named planar surface, as distinguished from the ordinary, concavely radiused spiral point provisions of conventional chip driver taps, that the present invention improves over the latter, as perhaps best illustrated in FIGS. 2, 3 and 4A–4E, inclusive.

That is, in transverse planes A—A through E—E, in axially spaced relation to one another from the tip of the tap 10 toward its rear, the intersection of the chamfered cutting diameter at 16 and the skew surface 20 produces positive rake angles $b$ on the latter at the successive cutting edges of the threads which progressively decrease to the rear. Thus, as illustrated in FIG. 3 in end elevation of the tap, the angle $b$ between a generally radial line element of surface 20 and a plane including the axis of tap 10 and the radially outer extremity of the cutting edge may amount to as much as 30° (although typically depicted in FIG. 3 as approximately 17°).

As then shown in FIGS. 4A through 4D, the rake angle $b$ progressively diminishes, in planes at A–D, inclusive, in FIG. 2, in steps of about 4°–5° over the partial-depth threads 16, ending in a zero or radial rake at the first full-depth cutting thread 17; while at the next thread 18 to the rear the rake angle becomes negative as shown in FIG. 4E.

It will be appreciated that the values of the rake angle $b$ may be varied by simply altering the angularity $a$ of the skew surface 20. Thus, if the nature of the material being tapped so suggests, the angle $b$ may become negative at a point a trifle forward of the first full-depth cutting thread 17. The flat nature of surface 20 makes it easy to set and control the milling or equivalent shaping cut for the purpose. In addition to the ability to alter the rake angle $b$ by varying the skew angle $a$, a comparable alteration may be had by bodily shifting the position of surface 20 transversely in relation to the tap axis, as indicated in dotted and dot-dash line in FIG. 3, or by a combination of such shift with a change of angle $a$.

While the skew surface 20 is illustrated and described as flat and planar, it will be evident that minor curvilinear variations in this respect may be resorted to or accepted, still obtaining the progressively diminishing yet positive cutting rakes toward the first full-depth cutting thread. In any case, the result is a breaking up of the normally continuously curled, elongated chips into individual and discontinuous chips, which are readily driven forward to the tip of the tap, without clogging or hanging up in the flutes 14 of the latter, and can be readily flushed out from the completed workpiece.

Furthermore, it is clear that, toward the nose or tip of the tool, chips are cut by an edge having a high rake angle, with maximum axial dimension, and the chips are relatively wide; while further to the rear of the skew gash the cutting rake is low, the axial cutting edge dimension and chips being narrower as the chamfer approaches the crest of the thread. High rake angles result in lower cutting forces per unit of cutting edge length than do low rake angles. Thus, by associating the high rakes at the flat skew gash with the wide cutting edges and the low rakes at the gash with the narrow cutting edges, the result is a more balanced loading of all the cutting stress teeth. Hence the cutting load at the chamfered forward skew gash end of the tap is well distributed and balanced.

In general, not only does the invention afford improved chip control in cutting by reason of the progressively diminishing and variable rake angle feature, but the danger of damage to or breaking of the tapping threads in reverse backing off of the tap from the workpiece is diminished due to improved support at the actual cutting edge extremities, at which the rake is least where the radius is most. Likewise, better thread finish and size control within precise tolerances have been found to be possible, possibly again by reason of the ability to better control the machining of the flat skew surface 20 than the machining of a spiral point, as done pursuant to the prior art.

What I claim as my invention is:

1. In a tap characterized by a tap body having threaded tapping lands spaced circumferentially from one another by longitudinal flutes, said lands being chamfered axially forwardly adjacent the tip of the tap from a rearward full cutting thread having a cutting edge of minimum axial dimension to a forward cutting thread having a cutting edge of maximum axial dimension, the improvement in accordance with which said flutes are radially concave, and comprising an outer end surface formation merging with and diverging radially of and forwardly from each flute to provide cutting edges for the cutting threads which are, as said edges succeed axially to the rear, at decreasing positive rake angles to a plane including the outer extremity of the cutting edge and the axis of the tap, said surface formation being in the main flat and at an acute skew angle to the axis of the tap, whereby there results a balancing of the stress loading of the cutting thread edges along the zone of said end surface formation.

2. In a tap characterized by a tap body having threaded tapping lands spaced circumferentially from one another by longitudinal flutes, said lands being chamfered axially forwardly adjacent the tip of the tap from a rearward full cutting thread having a cutting edge of minimum axial dimension to a forward cutting thread having a cutting edge of maximum axial dimension, the improvement in accordance with which said flutes are radially concave, and comprising an outer end surface formation merging with and diverging radially of and forwardly from each flute to provide cutting edges for the cutting threads which are, as said edges succeed axially to the rear, at decreasing positive rake angles to a plane including the outer extremity of the cutting edge and the axis of the tap, said surface formation being flat and at an acute skew angle to the axis of the tap, whereby there results a balancing of the stress loading of the cutting thread edges along the zone of said end surface formation.

3. In a tap characterized by a tap body having threaded tapping lands spaced circumferentially from one another by longitudinal flutes, said lands being chamfered axially forwardly adjacent the tip of the tap from a rearward full cutting thread having a cutting edge of minimum axial dimension to a forward cutting thread having a cutting edge of maximum axial dimension, the improvement in accordance with which said flutes are radially concave, and comprising an outer end surface formation merging with and diverging radially of and forwardly from each flute to provide cutting edges for the cutting threads which are, as said edges succeed axially to the rear, at decreasing positive rake angles, said surface formation being in the main flat and at an acute skew angle to a plane through the axis of the tap, whereby there results a balancing of the stress loading of the cutting thread edges along the zone of said end surface formation.

4. In a tap characterized by a tap body having threaded tapping lands spaced circumferentially from one another by longitudinal flutes, said lands being chamfered axially forwardly adjacent the tip of the tap from a rearward full cutting thread having a cutting edge of minimum axial dimension to a forward cutting thread having a cutting edge of maximum axial dimension, the improvement in accordance with which said flutes are radially concave, and comprising an outer end surface formation merging with and diverging radially of and forwardly from each flute to provide cutting edges for the cutting threads which are, as said edges succeed axially to the rear, at different rake angles to a plane including the outer extremity of the cutting edge and the axis of the tap, said surface formation being in the main flat and at an angle to the axis of the tap, whereby there results a balancing of the stress loading of the cutting thread edges along the zone of said end surface formation.

References Cited

UNITED STATES PATENTS

| 1,165,822 | 12/1915 | Wells | 10—141 |
| 2,202,236 | 5/1940 | Stomson | 10—141 |
| 2,255,997 | 9/1941 | Hanneman | 85—47 |

FOREIGN PATENTS

| 109,395 | 9/1917 | Great Britain. |

ANDREW R. JUHASZ, *Primary Examiner.*